(No Model.)
T. E. SCHUMPERT.
SEED PLANTER AND FERTILIZER DISTRIBUTER.
No. 469,096. Patented Feb. 16, 1892.
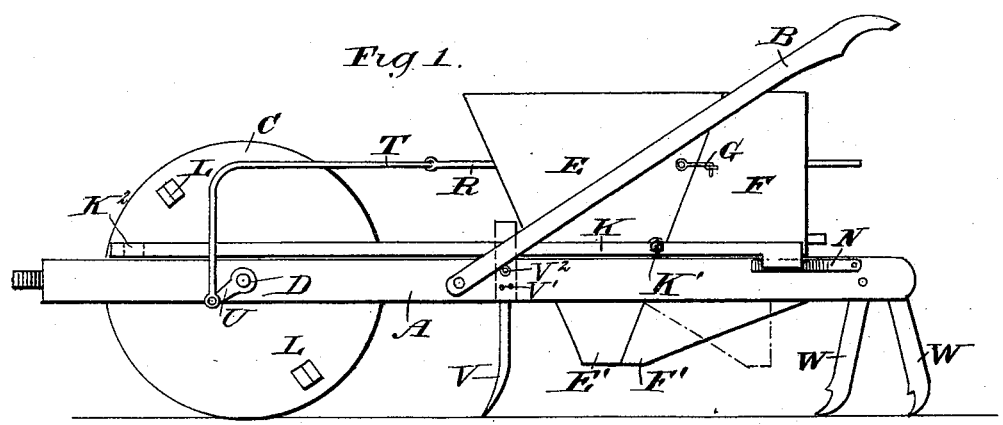
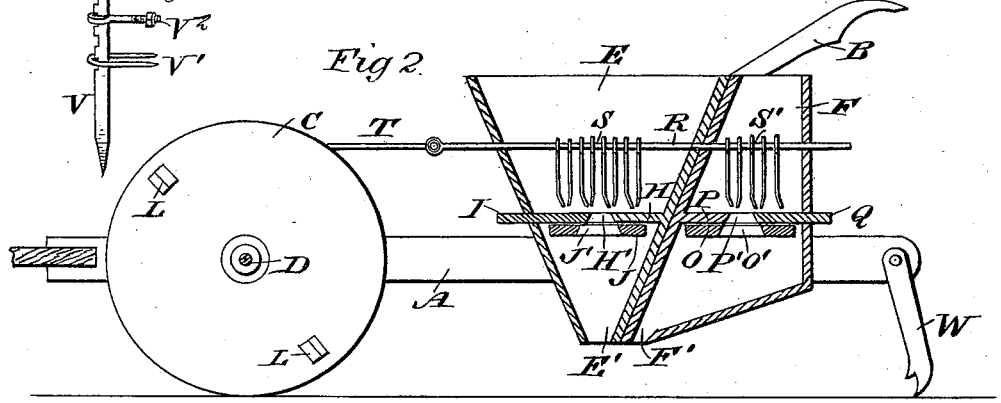
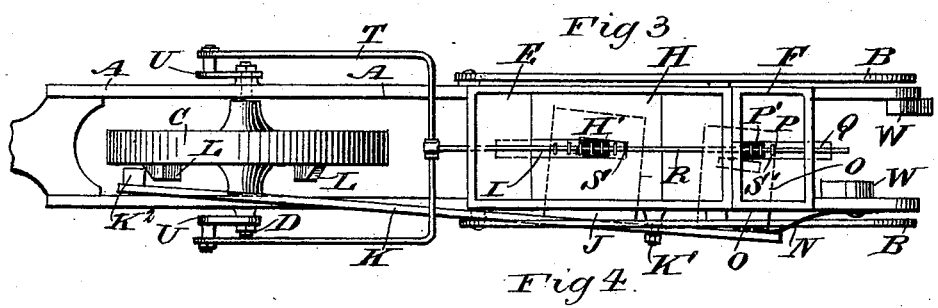
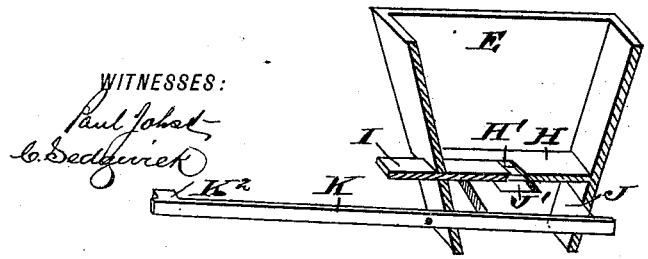
WITNESSES:
Paul Johot
C. Sedgwick
INVENTOR
T. E. Schumpert
BY Munn & Co
ATTORNEYS.

UNITED STATES PATENT OFFICE.

THOMAS E. SCHUMPERT, OF SPRING RIDGE, LOUISIANA.

SEED-PLANTER AND FERTILIZER-DISTRIBUTER.

SPECIFICATION forming part of Letters Patent No. 469,096, dated February 16, 1892.

Application filed September 3, 1891. Serial No. 404,647. (No model.)

*To all whom it may concern:*

Be it known that I, THOMAS E. SCHUMPERT, of Spring Ridge, in the parish of Caddo and State of Louisiana, have invented a new and Improved Seed-Planter and Fertilizer-Distributer, of which the following is a full, clear, and exact description.

The object of the invention is to provide a new and improved seed-planter and fertilizer-distributer which is simple and durable in construction, very effective in operation, and arranged to open or break the ground to form a furrow to drill the seed or to drop the seed and fertilizer into the furrow in holes located suitable distances apart and to cover the furrows.

The invention consists of certain parts and details and combinations of the same, which will be fully described hereinafter, and then pointed out in the claim.

Reference is to be had to the accompanying drawings, forming a part of this specification, in which similar letters of reference indicate corresponding parts in all the figures.

Figure 1 is a side elevation of the improvement. Fig. 2 is a sectional side elevation of the same. Fig. 3 is a plan view of the same. Fig. 4 is a sectional perspective view of the seed-hopper, and Fig. 5 is a perspective view of the opening-plow.

The improved seed-planter and fertilizer-distributer is provided with a suitably-constructed frame A, formed on its side beams with rearwardly-extending handles B, taken hold of by the operator for manipulating the machine. In the front end of the main frame A is arranged a drive-wheel C, provided with a shaft D, mounted to turn in suitable bearings secured on the main frame A.

In the rear of the drive-wheel C and between the handles B is secured on the frame A a seed-hopper E, to the rear end of which is adapted to be secured a fertilizer-box F by means of hooks G or other suitable devices. The two boxes E and F are formed on their lower ends with chutes E' and F', arranged in line with the wheel C and through which pass the seed and fertilizer to the ground.

Within the seed-box E is arranged a bottom H, provided with an opening H', adapted to be increased or diminished in size by means of a gate I, fitted to slide in the bottom H and extending through the front end of the said seed-box E. Underneath the bottom H is arranged a valve J, provided with an opening J', adapted to register with the opening H' in the bottom H, so as to permit seed to pass from the seed-box into the chute E' and drop from the latter to the ground.

The valve J is made in the shape of a block, mounted to slide transversely, the said block passing through the side of the seed-box E and fastened at its outer end to a lever K, fulcrumed on a stud K', attached to the side of the seed-box. The lever K extends forward and carries at its front end a lug $K^2$, adapted to be engaged by wedge-shaped lugs or projections L, secured on one face of the main drive-wheel C. Any desired number of wedge-shaped lugs L may be secured to the face of the drive-wheel C, the said lugs being arranged in a circle and preferably placed equal distances apart.

If only one lug is secured to the face of the main wheel C, the latter in making one revolution comes once in contact with the lug $K^2$, so that a swinging or horizontal motion in the arc of a circle is imparted to the lever K and the valve J, so that the latter registers with the opening H' in the bottom H. If two or more lugs are secured on the drive-wheel, the lever K receives a swinging motion two or more times, so that for each revolution of the wheel C the opening J' of the valve J is caused to register a like number of times with the opening H' in the bottom H. A return movement is given to the lever K by a spring N, secured on one of the side beams of the main frame A and pressing with its free end on the rear end of the said lever K. A valve O, similar to the valve J, is secured to the rear end of the lever K and extends into the fertilizer-box F underneath the bottom P of the said box F. The valve O is provided with an opening O', adapted to register with an opening P' in the bottom P. The opening P' can be increased or diminished, as desired, to drop more or less fertilizer at each registration of the openings O' and P', the said bottom being provided for this purpose with a gate Q, fitted to slide in the bottom and extending through the rear end of the fertilizer-box F.

It is understood that when the lever K is caused to swing by coming in contact with one of the lugs L then the valve J swings outward and registers with the opening H′, while the other valve O swings inward and registers with the opening P′.

Through the boxes E and F above the bottoms H and P, respectively, passes a rod R, extending longitudinally and carrying agitating-arms S and S′, extending in the boxes E and F, respectively, close to the bottoms H and P, respectively. The rod R is pivotally connected at its front end with a U-shaped pitman T, connected with crank-arms U, secured on the shaft D, so that when the drive-wheel C is rotated the said crank-arms U act on the pitman T, so that a reciprocating motion is given to the rod R and the agitating-arms S and S′. The latter thus agitate the seed and fertilizer, respectively, to cause the latter to pass readily through the openings H′ and P′ and the valves J and O into the chutes E′ and F′, respectively.

In front of the seed-box E is arranged a plow V, which passes through and is guided in a staple V′, which is secured to one of the side beams of the main frame A. The plow also passes through an eyebolt V² and is formed with a series of notches adapted to be engaged by the said eyebolt, so as to permit the plow to be raised or lowered, according to the depth of the furrow desired to be made. The plow V is arranged in line with the chutes E′ and F′, so that the seed dropping out of the latter falls into the furrow made by the plow V.

On the rear end of the main frame A are arranged the covering-shovels W, adapted to cover the furrow and the seed and fertilizer.

It will be seen that the entire machine is very simple and durable in construction and can be readily arranged to drop the seed and fertilizer in holes placed any desired distance apart, the lugs L being arranged correspondingly on the face of the main drive-wheel C. The fertilizer-box F can be readily dispensed with by unhooking the same from the seed-box E and then removing it from the machine.

Having thus described my invention, I claim as new and desire to secure by Letters Patent—

In a machine of the class described, the combination, with a main frame and a drive-wheel journaled therein and provided with one or more lugs arranged in a circle, of a lever adapted to be actuated by the said lugs, a valve secured on the said lever and formed with an opening, a seed-box supported on the said frame and provided with a bottom having an opening adapted to register with the opening in the said valve, a spring pressing on the said lever for returning the latter after engagement with the lugs, a fertilizer-box adapted to be secured to the said seed-box and provided with an apertured bottom, and a second valve secured to the said lever and formed with an opening adapted to register with the opening in the said fertilizer-box bottom, substantially as shown and described.

THOMAS E. SCHUMPERT.

Witnesses:
T. G. CALHOUN,
THOS. P. WILLIAMS.